Dec. 21, 1926.  
E. R. KULKA  
1,611,836  
CHRISTMAS TREE LIGHTING OUTFIT  
Filed June 29, 1926
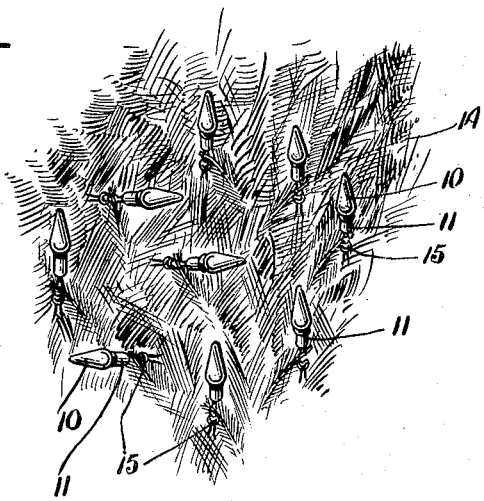
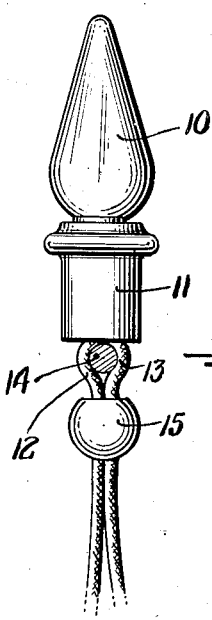
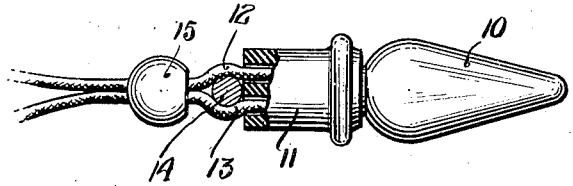
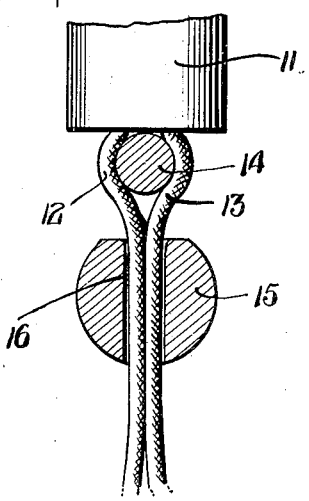
INVENTOR  
Eugene R. Kulka  
BY  
ATTORNEYS Patented Dec. 21, 1926.

1,611,836

UNITED STATES PATENT OFFICE.

EUGENE R. KULKA, OF NEW YORK, N. Y., ASSIGNOR TO C. D. WOOD ELECTRIC CO., INC., OF NEW YORK, N. Y., A CORPORATION OF NEW YORK.

CHRISTMAS-TREE-LIGHTING OUTFIT.

Application filed June 29, 1926. Serial No. 119,295.

My invention relates to a new and improved Christmas tree lighting outfit.

One of the objects of my invention is to devise a simple and efficient means for clamping the electric lights or bulbs of a Christmas tree outfit to the branches of the tree.

Another object of my invention is to devise a simple and efficient means for this purpose which will enable the electric lights or bulbs to be mounted upon the branches of the tree at any desired angle.

Other objects of my invention will be set forth in the following description and drawings which illustrate a preferred embodiment thereof, it being understood that the above general statement of the objects of my invention is intended to generally explain the same and not to limit it in any manner.

Fig. 1 is a perspective view of a complete outfit.

Fig. 2 is a detail elevation, partially in section and showing how a bulb is applied to the branch of a tree in a vertical position.

Fig. 3 is a view similar to Fig. 2 and shows how the bulb is applied and clamped to the branch of a tree in a horizontal position.

Fig. 4 is an enlarged detail view, partially in section.

Heretofore in Christmas tree lighting outfits, the small electric bulbs or lights have had flexible cords or conductors connected thereto, and each bulb or light was loosely mounted upon the branch of the Christmas tree by merely bending the cords in the form of a U shaped loop about the tree.

This means for connecting the bulbs to the Christmas tree was very unsatisfactory because the bulbs could never be tightly clamped or connected to the branches of the tree and they would frequently fall off, which thus increased the fire hazard.

According to my invention the cords of the socket of a light or bulb are combined with a very simple and efficient clamping means.

The tree is provided with any desired number of the bulbs 10 which are mounted in sockets 11, each socket 11 having flexible cords or conductors 12 and 13 connected thereto.

The cords or conductors 12 and 13 are connected to a plug or the like in the well-known manner (the plug not being shown, as in itself this is old and well-known) and each pair of cords 12 and 13 are combined with a slidable clamp 15 having an opening 16 through which the conductors 12 and 13 pass.

The cords 12 and 13 fit quite snugly into the opening 16, but the clamp 15 is easily slidable with respect to the cords 12 and 13.

Hence if a branch 14 is passed between the cords 12 and 13 and the clamp 15 is slid towards the branch 14, this causes the branch 14 to be tightly pressed against the bottom of the socket 11 and the frictional grip between the clamp 15 and the cords 12 and 13 is sufficient to maintain the socket 11 firmly in position.

The socket 11 can be disengaged from the branch 14 by merely sliding the clamp 15 away from the branch 14.

As shown in Fig. 3 the sockets 11 may be mounted and clamped in the horizontal position so that various ornamental effects may be secured by mounting the sockets 11 of a complete outfit at various angles.

For example, although I have shown the clamp 15 as provided with a single opening for the cords, my invention is not limited to the use of a single opening.

I have shown a preferred embodiment of my invention, but it is clear that numerous changes and omissions could be made without departing from its spirit.

I claim:—

1. An ornamental lighting outfit including an electric light socket having separated flexible members connected thereto and adapted to support the same, and a slidable clamping member through which the separated conductors pass, the said clamping member being adapted to clamp the separated conductors to a support located intermediate said conductors.

2. An ornamental lighting outfit, the combination of an electric light socket having flexible separated conductors connected thereto and adapted to support the same, and a clamping member having an opening through which both said separated conductors pass, the said conductors fitting snugly into the said opening.

In testimony whereof I affix my signature.

EUGENE R. KULKA.